United States Patent [19]

Bolli et al.

[11] Patent Number: 5,304,086
[45] Date of Patent: Apr. 19, 1994

[54] TOY CONSTRUCTION ELEMENT

[75] Inventors: Peter Bolli, Steinhausen; Heinz Looser, Baar, both of Switzerland

[73] Assignee: INTERLEGO A.G., Baar, Switzerland

[21] Appl. No.: 899,012

[22] Filed: Jun. 15, 1992

Related U.S. Application Data

[63] Continuation of Ser. No. 582,962, filed as PCT-CH90/00038, Feb. 19, 1990, abandoned.

[30] Foreign Application Priority Data

Feb. 24, 1989 [CH] Switzerland ............................. 679/89

[51] Int. Cl.$^5$ ............................................. A63H 33/10
[52] U.S. Cl. .................................... 446/108; 446/104
[58] Field of Search ............... 446/107, 378, 113, 122, 446/125, 111, 104, 108; 403/92, 101, 103, 97

[56] References Cited

U.S. PATENT DOCUMENTS

| | | | |
|---|---|---|---|
| 1,860,627 | 5/1932 | Sherman | 446/113 X |
| 3,277,601 | 10/1966 | Ryan | 446/378 |
| 3,979,855 | 9/1976 | Schmidt et al. | 446/113 X |
| 4,430,826 | 2/1984 | Ryaa | 403/97 X |
| 4,773,503 | 9/1988 | Purkapile | 403/97 X |

*Primary Examiner*—Mickey Yu
*Attorney, Agent, or Firm*—Kane, Dalsimer, Sullivan, Kurucz, Levy, Eisele and Richard

[57] ABSTRACT

A rod is provided with a plurality of bores disposed in a row. In the area of the two end bores the rod has only half the thickness and parallel plane faces. Coaxial to the end bores an annular groove is formed on one face. A toothed rim with radial teeth extends axially on the base of the annular groove. Two such rods may be connected by the teeth of the on tooth rim interdigitating between teeth of the other tooth rim with the rods at a desired angle with each other.

18 Claims, 2 Drawing Sheets

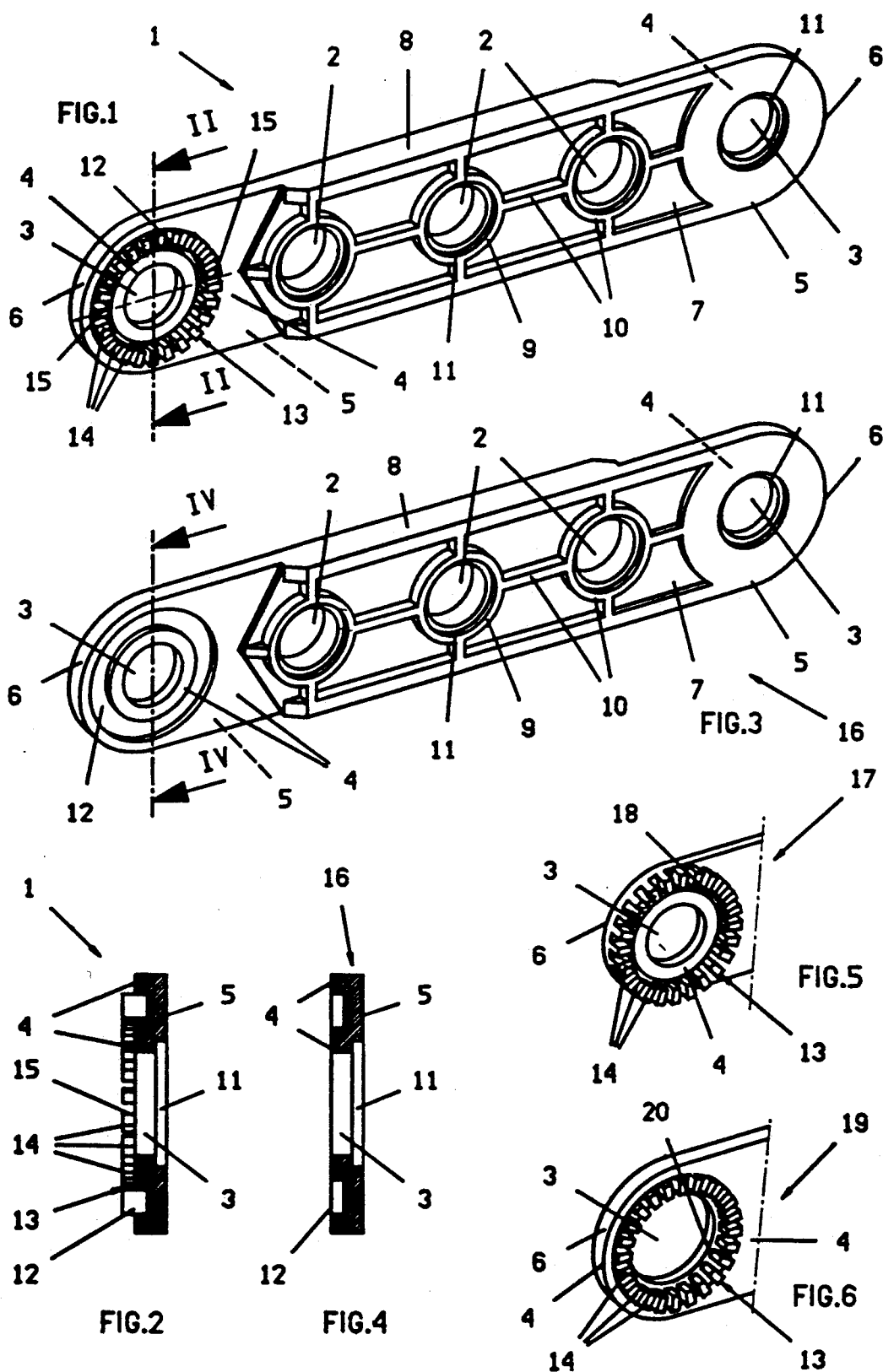

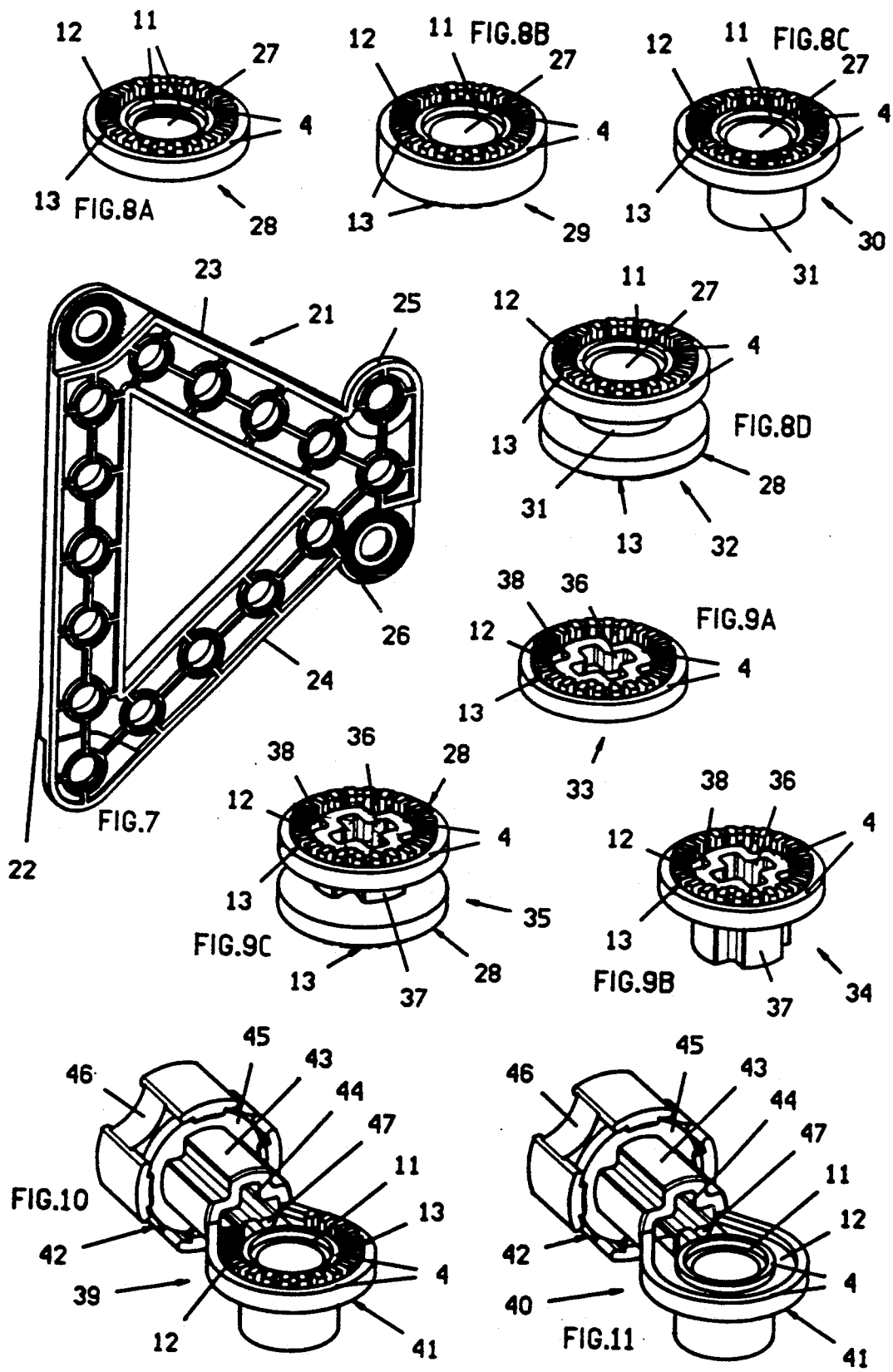

2

TOY CONSTRUCTION ELEMENT

This is a continuation of copending application(s) Ser. No. 07/582,962, filed as PCT/CH90/00038, Feb. 19, 1990, abandoned.

BACKGROUND OF THE INVENTION

The present invention relates to a construction element for a toy construction set.

Construction elements in the form of connectable blocks, beams, flat rods, etc., are known and commercially available. In such construction elements bores are used to couple two construction elements with each other by inserting connecting parts which lock into the bore. Such a plug-like connecting part is known from Swiss patent CH-PS 658 887, for example.

Furthermore, from the Swiss patent a connecting device is known with a pair of connection parts for detachable, rigid connection of a plurality of longitudinal toy construction elements such as shafts and rods at different angular positions. The connection parts contain a bushing with a cylindrical surface, wherein one front face of the bushing has a toothed edge. Adjacent bushings of this type can be brought into a rigid engagement with each other by nesting the toothed edges, whereby the angular position of the bushings is selectable in accordance with the pitch of the teeth of the toothed edges.

Flat rods are commercially available, in a toy set of the type described, wherein each is provided with an end bore having a toothed edge encompassing one face of a bore so as to provide a rigid connection in a selectable angular position with another construction element which also has a toothed edge, for example, a flat rod or a bushing.

These known and commercially available construction elements have a fundamental disadvantage for toy-construction sets which are based on a defined construction module, (i.e. wherein the dimensions of the elements as well as the positioning of coupling means on the elements are based on a module dimension) since the toothed edges of the corresponding construction elements cannot be randomly formed with respect to their thickness and longitudinal dimensions. As a consequence of this, during assembly of a plurality of such construction elements the module of the construction unit cannot be adhered to in many connection cases as a result of the engagement of their toothed edges. This complicates the construction of certain toy models or renders the same impossible.

It is therefore an object of the invention to provide a construction element of the aforementioned type which is provided with a tooth construction in the area of the bore which permits the element to adhere to a module during random assembly with another adjacent construction element.

SUMMARY OF THE INVENTION

A toy construction set element in accordance with the present invention is provided wherein parts of the tooth construction of two interengaged construction elements which extend beyond the end faces of the bore are always received in the parts of the tooth construction of the construction elements, which extend into the construction elements or which are disposed in the annular recesses of the construction elements. Thus, despite the tooth construction the endfaces of the bores of the two construction elements which face each other also support each other, so that a module for the construction set remains intact, e.g., the total thickness or the total length of the superimposed construction elements is an integral multiple or an integral fraction of the module. As a result the module may be maintained during construction of a model which utilizes such elements.

The present invention also relates to a construction set with a plurality of construction elements as described above. Furthermore, the construction set may also have additional construction elements which have the above described features with the exception that no tooth construction is formed in the annular recess. Thus, a construction element provided with the tooth construction can be assembled with a further element in the form of a movable joint connection, in that the extending part of the tooth construction of the one construction element can be received in the recess of the other construction part.

BRIEF DESCRIPTION OF THE DRAWINGS

Exemplified embodiments of the subject matter of the invention are explained in the following in conjunction with the drawings in which:

FIG. 1 a perspective view of a construction element in accordance with the invention in the form of a rod, wherein the tooth construction is disposed in an annular groove;

FIG. 2 a section along line II—II of FIG. 1;

FIG. 3 a perspective view of a construction element in the form of a rod similar to FIG. 1, with an annular groove without a tooth construction;

FIG. 4 a section along line IV—IV of FIG. 3;

FIG. 5 a perspective view of an end area of a rod similar to FIG. 1 with an outer radial recess formed in the periphery;

FIG. 6 a perspective view of an end area of a rod similar to FIG. 1, with an inner annular-like recess around the bore;

FIG. 7 a perspective view of a uniform construction element formed with a plurality of rod like parts with tooth structures;

FIG. 8A to 8D are perspective views of further embodiments of the construction element in accordance with the invention in the form of bushings provided wit cylindrical bores and with tooth constructions;

FIG. 9A to 9C are perspective views of further construction elements in accordance with the invention in the form of bushings with a tooth construction and whose bore has a cross-like cross section; and FIGS. 10 and 11 are perspective views of two bushings with and without tooth construction and provided with a connection attachment.

DETAILED DESCRIPTION OF THE PREFERRED EMBODIMENTS

In accordance with FIG. 1 a rod 1 has five cylindrical bores 2 and 3 of uniform diameter, whose axis are all disposed in a symmetry plane of rod 1 and which are equispaced from each other by a distance equal to a module M of a construction set. The total length of rod 1 is 5 M and its width is M. The thickness of rod 1 in the area of the three intermediary bores 2 equals $\frac{1}{4}$ M. Rod 1 is offset by half of the thickness, i.e. $\frac{1}{8}$ M, in the area of the end bores 3 and in this area is provided with a plane face 4. On the opposite side rod 1 is also provided with a plane face 5 in the area of end bores 3. The distance between the two plane faces 4 and 5 is $\frac{1}{8}$ M. Coaxially with the end bores 3 the rod has rounded off end faces 6.

In the area of the intermediary bores 2 the rod 1 consists of a separating wall 7 and an edge wall 8 extending therefrom on both sides which have a width of ¼ M. Each intermediary bore 2 is formed by a socket 9 which extends from the separating wall 7, whereby each socket 9 is connected by ribs 10 with the adjacent sockets 9 and edge 8. On both sides the intermediary bores 2 each have a cylindrical counterbore 11 for receiving an edge shoulder of a plug element which connects two rods 1 with each other or a rod 1 with another construction element.

In accordance with FIGS. 1 and 2 an annular groove 12 is formed on the plane face 4 coaxially with respect to the end bores 3. The annual groove 12 has a depth which is at least equal to half the thickness of rod 1 in the offset area around the end bores 3 or is somewhat larger, e.g., at least equal to 1/16 M. A toothed rim 13 with teeth 14 extends from the base of annular groove 12 as a radial tooth construction. Teeth 14 are angularly disposed so that the angle between adjacent teeth of the toothed rim 13 is thereby provided with 24 teeth. Furthermore, two diametrically opposed teeth flanks 15 lay in the plane containing the axes of the bores 2, 3. On the side opposite of the toothed rim 13 with plane face 5 each end bore 3 also has a cylindrical counterbore 11.

As can be seen from FIGS. 5 and 6 the teeth 14 of the toothed rim 13 extend beyond the plane face 4. The height of the extending part of the teeth 14 is 1/16 M in the case of rod 1. In other words, one half of the toothed rim 13 extends beyond face 14 and the other half fits into the annular groove 12 of rod 1.

Rod 16 illustrated in FIGS. 3 and 4 differs from rod 1 of FIGS. 1 and 2 in that the annular groove 12 is not provided with a tooth construction, but rather is open on the side of the plane face 4. The purpose of rod 16 is explained in the following.

For connecting two rods of the embodiments of FIGS. 1, 2 and 3, 4 the rods are superimposed with the bores 3 aligned and with the sides having the annular groove 12 and/or the toothed rim 13 facing, whereupon a plug element, not shown, for example a yielding bushing provided at its end with shoulders is inserted through the bores. Depending on the combination of the rods 1, 16 employed the following situations may result:

1) Two rods 1 (FIG. 1, 2) can be connected with each other with the plug element in that their toothed rims 13 interlock. Thereby, the extending parts of the teeth 14 of the one toothed rim 13 of the one rod 1 reaches between the teeth 14 of the toothed rim 13 of the other rod, so that the plane faces 4 of the two rods 1 are superimposed with each other. Thereby, the two rods may either be aligned with one another or be disposed at an angle with each other selectable in steps of 15°. The selectable angle between the two rods 1 is at a minimum of 60°.

2) When connecting two rods 16 (FIG. 3, 4) the faces 4 of the two rods 16 are superimposed with each other. In this case the annular grooves 12 do not perform any function and a movable joint connection is provided.

In both of the described rod connections the advantage is obtained that the connected elements are true to the module dimension because the front faces of the toothed rim 13 do not provide any support faces during assembly and support is exclusively between the plane faces 4. This can also be seen from the fact that the faces of two rods 1 or 16 which are connected with each other are disposed into the same planes.

The construction element 17 shown in FIG. 5 is shaped substantially the same as the construction element 1 of FIG. 1. The difference here is that instead of the annular groove 12 an annular like recess 18 is provided which extends coaxially with the end bore 3 partially beyond the edge of the rounded off end face 6. This recess 18 is also provided with a toothed rim 13.

The construction element 19 which is illustrated in FIG. 6 is provided with an annular like recess 20 which is provided with the toothed rim which is formed between the plane face 4 and the end bore 3.

In FIG. 7 construction element 21 is illustrated. Element 21 is based on an assembly of a plurality of rods 1 of FIG. 1. The unitary construction element illustrated in FIG. 7 is substantially in the form of a uniform triangle with a rod-like base 22 and two rod like sides 23 and 24. The base 22 and sides 23, 24 are uniformly shaped, with the exception of their end areas. The end areas of base 22 which are also the end areas of sides 23 and 24 are similar to the end areas of rod 1 of FIGS. 1 and 2. The other end area of sides 23, 24 which coincide are provided with extended cover plates 25 and 26 which are shaped like the end areas of rod 1 of FIGS. 1, 2. It can be seen that the end areas of construction element 21 are shaped to be connected with further construction elements of the same type or with rods 1 or 16 in accordance with FIG. 1 or 2, for obtaining a lattice structure such as a framework.

Further embodiments of elements in accordance with the invention are illustrated in FIGS. 8A to 8D, which are in the shape of disks or bushings and have a cylindrical bore 27. Moreover, all of the construction elements are provided either on one or both of their front faces with the annular groove 12 and the toothed rim 13 of FIG. 1 which partially extends into annular groove 12.

The construction element 28 of FIG. 8A is in form of a disk. Its thickness is an integral fraction of module M of the construction unit, here, for example, ⅛ M, without including the extending part of toothed rim 13. The construction element 29 of FIG. 8B differs from construction element 28 of FIG. 8A by its greater thickness which, in this case, is ¼ M. Moreover, the construction element 29 is also provided with an annular groove (not visible in FIG. 8B) and a toothed rim 13 on its opposite face.

The construction element 30 of FIG. 8C corresponds to the construction element of FIG. 8A, but is additionally provided with an extended cylindrical attachment 31 with a bore 27 therethrough. This bushing like construction element 30 has a height which is an integral fraction of module M, equal to module m or an integral multiple of module M.

The bushing like construction element 32 of FIG. 8D is provided with a disk-like construction element 28 in accordance with FIG. 8A on both of its faces. The two disk like construction elements 28 are connected with each other by a cylindrical attachment 31 in accordance with FIG. 8C. The total height of the construction element 32 (without considering the extending parts of toothed rims 13) is also true to the module dimension.

The construction elements illustrated in FIG. 8A to 8D are also provided with cylindrical counterbores 11 for receiving a plug element.

The perspectively illustrated construction elements 33, 34 and 35 in FIGS. 9A, 9B and 9C substantially correspond to the construction elements 28, 30 and 32 of FIGS. 8A, 8C and 8D. The difference is that their bores 36 are not cylindrically, but rather have a cross like cross section. For reasons of manufacturing the attachment 37 (FIG. 9B, 9C) is therefore not cylindrical, but cross shaped. Accordingly, the radial inner wall 38 of the annular groove 12 is not formed cylindrically, but rather cross shaped.

In FIGS. 10 and 11 two similar construction elements in accordance with the invention are perspectively illustrated. Each construction element 39 or 40 has a bushing like part 41 which is provided with annular groove 12 on its upper face. A connection attachment 42 extends on the bushing like part 1 for a cross axis. The connection attachment 42 consists of a socket 43 which has a bore 44 with a cross shaped cross section for receiving the cross axis.

A flange 45 extends to socket 43. A clamping part 46 which can be axially displaced on the cross axis and can be locked in a selected position on the cross axis engages the flange 45 in a rotatable manner.

In the construction element 39 of FIG. 10 a toothed rim 13 extends in the annular groove 12 in accordance with rod 1 of FIG. 1, while the element 40 of FIG. 11 is provided with an annular groove 12 only in accordance with the rod 16 of FIG. 3. In both construction elements 39, 40 the annual groove 12 is laterally open in the partial area 47 facing the bores 44 of socket 43, e.g., the radial outer side wall of the annual groove 12 is missing in the partial area 47. Correspondingly, the toothed rim 13 does not extend into the partial area 47 in construction element 39.

We claim:

1. A construction element for a toy-construction set, said element having a middle portion, and an end portion with a throughgoing hole having an axis and extending between opposed first and second plane supporting faces which are perpendicular to said axis and which serve as abutments for other construction elements of the set, an annular recess extending from said first supporting face coaxial to said axis, a toothed rim extending coaxially with said axis from a base of said recess, radial teeth of said rim extending to at least half their axial length within said recess and projecting with at most half their axial length above said first supporting face wherein the element is a rod and said hole is a cylindrical boring, wherein said rod comprises a plurality of cylindrical further borings with parallel further axes, all axes laying in a common plane and being equidistantly spaced by a spacing equal to an integer multiple of a distance between said first and second supporting faces, wherein said middle portion has a thickness, said thickness being larger than said distance.

2. A construction element in accordance with claim 1, wherein two of the flanks of the teeth of said toothed rim lay in said common plane of said axes.

3. A construction element in accordance with claim 1, wherein said annular recess is an annular groove and said first supporting face is located in a radial direction at both sides of said annular groove.

4. A construction element in accordance with claim 1, wherein said first supporting face is disposed in a radial direction within said recess.

5. A construction element in accordance with claim 1, wherein said annular recess is formed about said hole in such a manner that said first supporting face is disposed in a radial direction outside of said recess.

6. A construction element in accordance with claim 1, wherein the depth of said recess in an axial direction of said hole is an integer fraction of the distance between said two supporting faces.

7. A construction element in accordance with claim 1, wherein the depth of said recess is less than the distance between said first and second supporting faces and the height of said teeth projecting above said first supporting face is at most half said distance.

8. A construction element in accordance with claim 7, wherein said radial teeth have flanks which extend in planes substantially parallel to said axis.

9. A construction element in accordance with claim 1, wherein the teeth of said toothed rim have a pitch of 15°.

10. The construction element in accordance with claim 1 wherein the distance between said first and second supporting faces is equal to an integer fraction of a width of the element measured perpendicular to said axis.

11. The construction element of claim 1 wherein said thickness is equal to an integer multiple of said distance.

12. A toy construction set comprising a plurality of first bars, each of said first bars having a plurality of throughgoing first cylindrical borings having parallel equidistantly spaced first axes laying in a common plane, a first end boring of said first borings extending between opposed first and second plane supporting faces which are perpendicular to said first axes and which serve as abutment for other construction elements of the set, an annular first recess extending from said first supporting face coaxial to said first axis of said first end boring, a toothed rim extending coaxially to said first axis of said first end boring from a base of said first recess, radial teeth of said rim extending to at least half their axial length within said first recess and projecting with at most half their axial length above said first supporting face, wherein said construction set further comprises a plurality of second bars, each of said second bars having a plurality of throughgoing second cylindrical borings having parallel, equidistantly spaced second axes laying in a common plane, a second end boring of said second borings extending between opposed third and fourth plane supporting faces which are perpendicular to said second axes and which serve as abutment for other construction elements of the set, wherein a toothless second recess coaxial to said second axis extends from said third supporting face, the axial depth of said second recess corresponding to one half of the axial length of the teeth of the first element and the radial width of said second recess corresponding tot he radial width of said teeth, for accommodating the part of the teeth of the first element projecting above said first supporting face, wherein the distance between said first and second supporting face and the distance between said third and fourth supporting face are equal to an integer fraction of the spacing of said first and second axes.

13. A construction set in accordance with claim 12, wherein said second annular recess of said second element is an annular groove disposed in such a manner that said third supporting face is located in radial direction at both sides of said annular groove.

14. A construction set in accordance with claim 12, wherein said third supporting face is disposed in radial direction within said second recess.

15. A construction set in accordance with claim 12, wherein said second annular recess of said second elements is formed around said second hole in such a manner that said third supporting face is disposed in radial direction outside of said second recess.

16. A construction set in accordance with claim 12, wherein the depth of said second recess of said second elements in the axial direction of said second hole is an integer fraction of the distance between said third and fourth supporting faces of said second element.

17. The toy construction set in accordance with claim 12 wherein the width of said first and second bars measured perpendicularly to said common planes is equal to the spacing between said first and second axes.

18. A construction element for a toy-construction set, said element having a throughgoing hole having an axis and extending between opposed first and second plane supporting faces which are perpendicular to said axis and which serve as abutment for other construction elements of the set, an annular recess extending from said first supporting face coaxial to said axis, a toothed rim extending coaxially to said axis from a base of said recess, radial teeth of said rim extending to at least half their axial length within said recess and projecting with at most half their axial length above said first supporting face wherein a further recess coaxial to said axis extends from said second supporting face and a further toothed rim extends from a base of said further recess.

* * * * *